(12) United States Patent
Chiang et al.

(10) Patent No.: US 7,527,230 B2
(45) Date of Patent: May 5, 2009

(54) ANCHOR DOCK EQUIPPED WITH A BRACING RACK

(75) Inventors: Wei-Jen Chiang, Taipei (TW); Kun-Yen Lu, Taipei (TW); Kuo-Yuan Hung, Taipei (TW)

(73) Assignee: Kinpo Electronics, Inc., Taipei (TW)

( * ) Notice: Subject to any disclaimer, the term of this patent is extended or adjusted under 35 U.S.C. 154(b) by 39 days.

(21) Appl. No.: 11/850,809

(22) Filed: Sep. 6, 2007

(65) Prior Publication Data

US 2009/0065672 A1 Mar. 12, 2009

(51) Int. Cl.
*A44B 1/18* (2006.01)
(52) U.S. Cl. .............. 248/205.5; 248/206.2; 248/917
(58) Field of Classification Search ............ 248/206.2, 248/205.5, 917, 919, 922, 923, 206.1, 683, 248/362, 363, 309.3; 224/929, 559
See application file for complete search history.

(56) References Cited

U.S. PATENT DOCUMENTS 6,663,064 B1 * 12/2003 Minelli et al. ............ 248/205.5

6,913,232 B2 * 7/2005 Richter .................. 248/205.8
7,007,908 B2 * 3/2006 Tsay ..................... 248/309.3
7,344,114 B2 * 3/2008 Richter .................. 248/205.5
2007/0278371 A1 * 12/2007 Wang ..................... 248/309.3

FOREIGN PATENT DOCUMENTS

WO    WO 9302851 A1 *   2/1993

* cited by examiner

*Primary Examiner*—Korie Chan
(74) *Attorney, Agent, or Firm*—Muncy, Geissler, Olds & Lowe, PLLC

(57) ABSTRACT

An anchor dock includes an anchor body, an adsorption portion and a bracing rack. The anchor body has a lower shell and an upper shell. The lower shell has a conical side surface formed at a sloped angle. The upper shell is located on an upper surface of the lower shell. The adsorption portion is located below the anchor body. The bracing rack is formed in a U-shape and surrounds the upper shell and has two ends hinged on the anchor body.

5 Claims, 6 Drawing Sheets

ANCHOR DOCK EQUIPPED WITH A BRACING RACK

BACKGROUND OF THE INVENTION

1. Field of the Invention

The present invention relates to an anchor dock and particularly to an anchor dock equipped with a bracing rack.

2. Description of the Prior Art

In recent years portable electronic devices are increasingly popular, such as personal digital assistants (PDAs), portable GPS, digital audio/video players, handsets and the like. When in use people generally hold the portable electronic device in hands. It is inconvenient when both hands have to do something. For instance, to use the mobile phone during driving, with one hand holding the handset and other hand maneuvering the steering wheel not only is troublesome, also could cause traffic accidents. Hence many people prepare a holding apparatus to hold the handset so that they can drive safely during talking to the handset.

Refer to FIG. 1 for a conventional handset holding apparatus. The holding apparatus 1000 includes an anchor dock 1100 and a holding dock 1200. The anchor dock 1100 includes an anchor body 1120, a bracing rack 1140 and a suction cup 1160. The holding dock 1200 aims to hold a handset 40. The bracing rack 1140 has one end fastened to the holding dock 1200 and another end fastened to the anchor body 1120. The anchor body 1120 has a bottom coupled with the suction cup 1160 which is adsorbed onto a flat surface.

The bracing rack 1140 is made of flexible material, hence users can bend the bracing rack 1140 to adjust the relative angle between the holding dock 1200 and the anchor body 1120. In general, the bending angle of the bracing rack 1140 cannot be greater than 180°. Hence it is not very convenient to adjust the angle as desired. Moreover, due to the bracing rack 1140 is made of the flexible material, after being used for a period of time in bending or the bending angle is greater, elastic fatigue easily occurs. Then to adjust precisely the angle of the holding dock 1200 becomes not possible. In addition, the anchor dock 1100 is quite bulky and not easy to carry.

Hence how to make the bracing rack of the anchor dock to have a greater adjusting angle and a longer life span, and shrink the size of the anchor dock are issues pending to be resolved in the industry.

SUMMARY OF THE INVENTION

The primary object of the present invention is to provide an anchor dock that has a smaller size and longer life span and is equipped with a bracing rack which has a greater adjustable angle.

To achieve the foregoing object the anchor dock of the invention includes an anchor body, an adsorption portion and a bracing rack. The anchor body has a lower shell and a upper shell. The lower shell has a conical side surface formed at a sloped angle. The upper shell is located on a upper surface of the lower shell. The adsorption portion is located below the anchor body. The bracing rack is formed in a U-shape and surrounds the upper shell, and has two ends hinged on the anchor body.

In one aspect the adsorption portion is a suction cup. The upper shell has a sliding trough with a longitudinal slot formed on each of two sides thereof. The anchor dock further includes an upright post, a pushing member and a first axle. The upright post has a bottom end connecting to the upper side of the suction cup and a top end with a first through hole formed thereon. The pushing member has one end with two latch plates located thereon. Each of the latch plates has a second through hole. The first axle runs through the slot, first through hole and second through hole. The bracing rack surrounds the upper shell and the pushing member. The anchor dock also has a spring coupled on the upright post. The suction cup has a drawing element located at an outer rim thereof.

In another aspect the sloped angle of the side surface of the lower shell is between 30° and 60°.

In yet another aspect the anchor dock further includes a latch tray located on the bracing rack.

When the bracing rack of the invention swivels it does not interfere with the upper shell and the pushing member. As the lower shell has the conical side surface formed at the sloped angle, the bracing rack can be swiveled at an angle greater than 180°. Compared with the conventional bracing racks, the bracing rack of the invention does not have the problem of elastic fatigue, thus has a longer life span. The anchor dock of the invention also can be formed with a compact profile to facilitate carrying.

The foregoing, as well as additional objects, features and advantages of the invention will be more readily apparent from the following detailed description, which proceeds with reference to the accompanying drawings.

DESCRIPTION OF THE PREFERRED EMBODIMENT

Figure 2:
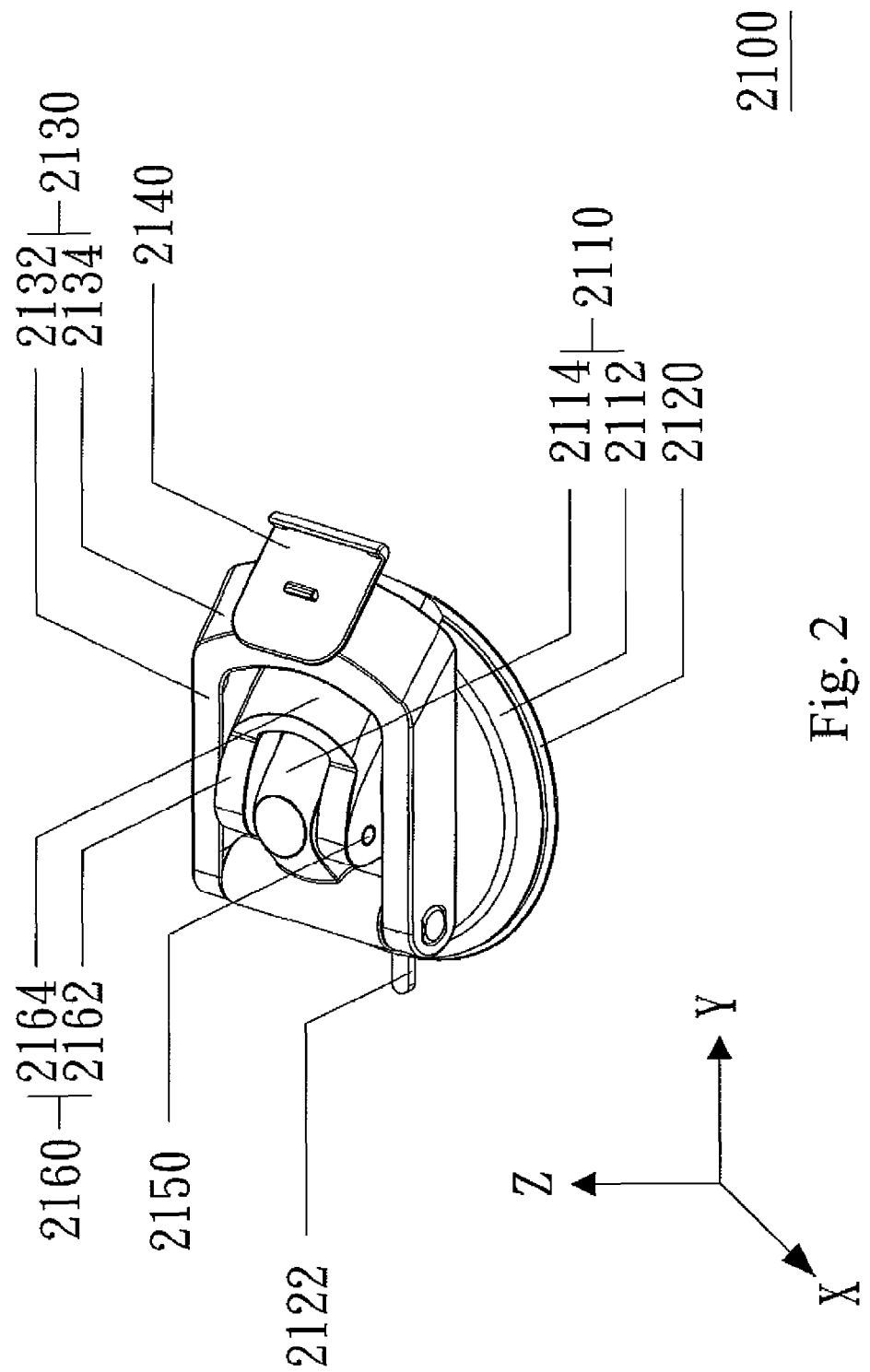
FIG. 2 is a perspective view of an embodiment of the anchor dock of the invention.
Figure 3:
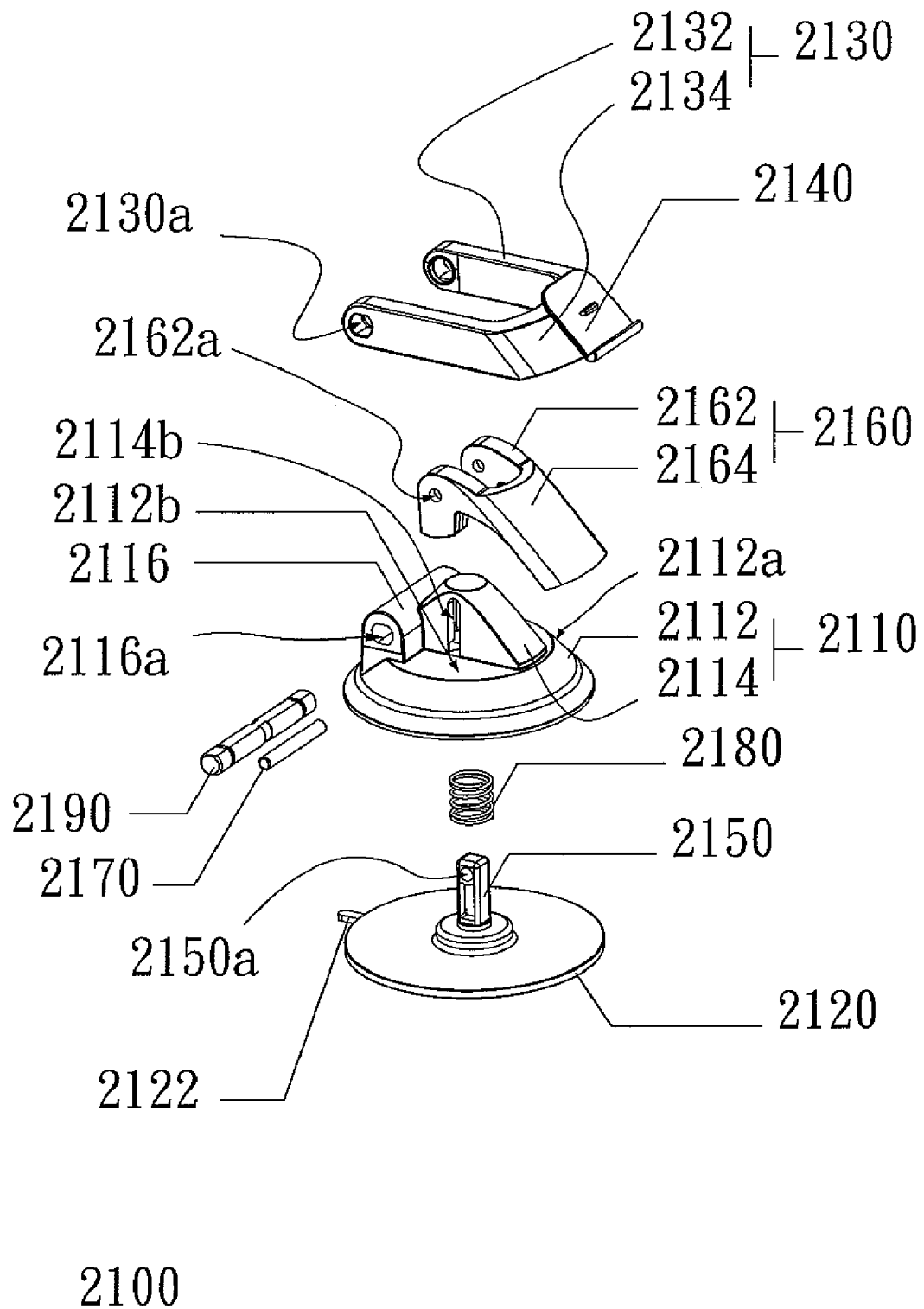
FIG. 3 is an exploded view of an embodiment of the anchor dock of the invention.

Refer to FIGS. 2 and 3 for an embodiment of the invention. The anchor dock 2100 of the invention includes an anchor body 2110, a suction cup 2120, a bracing rack 2130 and a latch tray 2140. The anchor body 2110 has a lower shell 2112 and a upper shell 2114. The lower shell 2112 has a sloped side surface 2112a. The upper shell 2114 is located on an upper surface 2112b of the lower shell 2112. The suction cup 2120 is located below the anchor body 2110.

Figure 1:
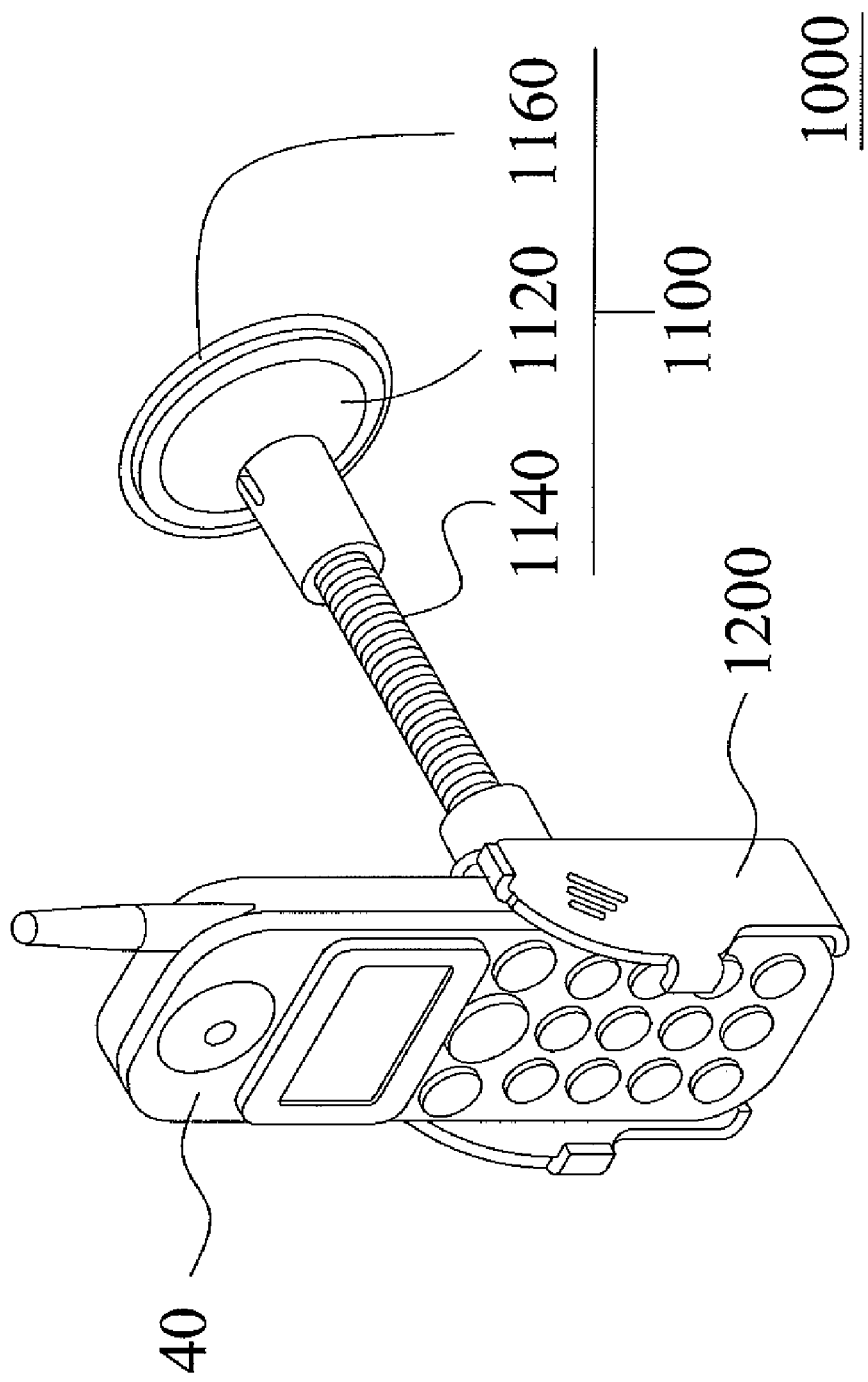
FIG. 1 is a conventional holding apparatus for a handset.

The bracing rack 2130 is formed in a U-shape, and has two first hinge apertures 2130a formed at two ends thereof. The anchor body 2110 also has a hinge dock 2116, which has a second hinge aperture 2116a. A second axle 2190 is provided to run through the first hinge apertures 2130a and the second hinge aperture 2116a to hinge the bracing rack 2130 on the anchor body 2110. The second axle 2190 is tightly coupled with the second hinge aperture 2116a. The latch tray 2140 is located on a transverse bar 2134 of the bracing rack 2130 to latch the holding dock 1200, as shown in FIG. 1, on the bracing rack 2130.

Figure 4A:
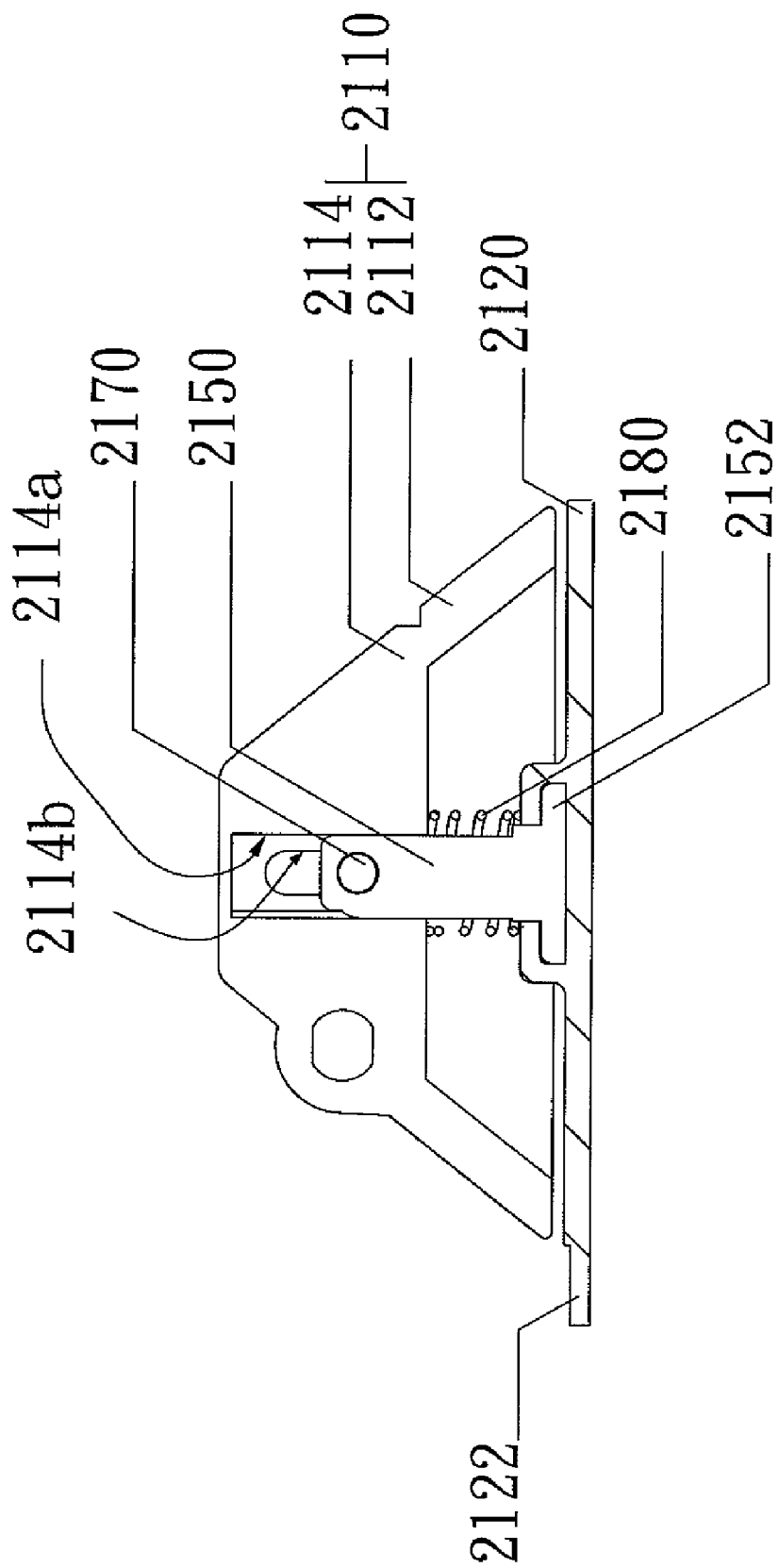
FIG. 4A is a sectional view of an embodiment of the anchor of the invention with the pushing member in a released condition.

Refer to FIGS. 3 and 4A for a condition in which a pushing member is released. In the FIG. 4A, the bracing rack 2130 and the pushing member 2160 is omitted to facilitate discussion.

The upper shell 2114 has a sliding trough 2114a inside with a longitudinal slot 2114b formed at each of two sides. The anchor dock 2100 further has a upright post 2150, a pushing member 2160 and a first axle 2170. The upright post 2150 is slidably located in the sliding trough 2114a, and has a first through hole 2150a formed on the top end and a flange 2152 formed at the bottom thereof. The suction cup 2120 has an upper portion encasing the flange 2152 so that the upright post 2150 can be connected to the upper side of the suction cup 2120. The pushing member 2160 has one end with two latch plates 2162 formed thereon and a pushing portion 2164 at another end. The pushing member 2160 can be operated by moving the pushing portion 2164. The latch plates 2162 have respectively a second through hole 2162a. The first axle 2170 runs through the slot 2114b, first through hole 2150a and second through hole 2162a to assemble the suction cup 2120 below the anchor body 2110.

Figure 4B:
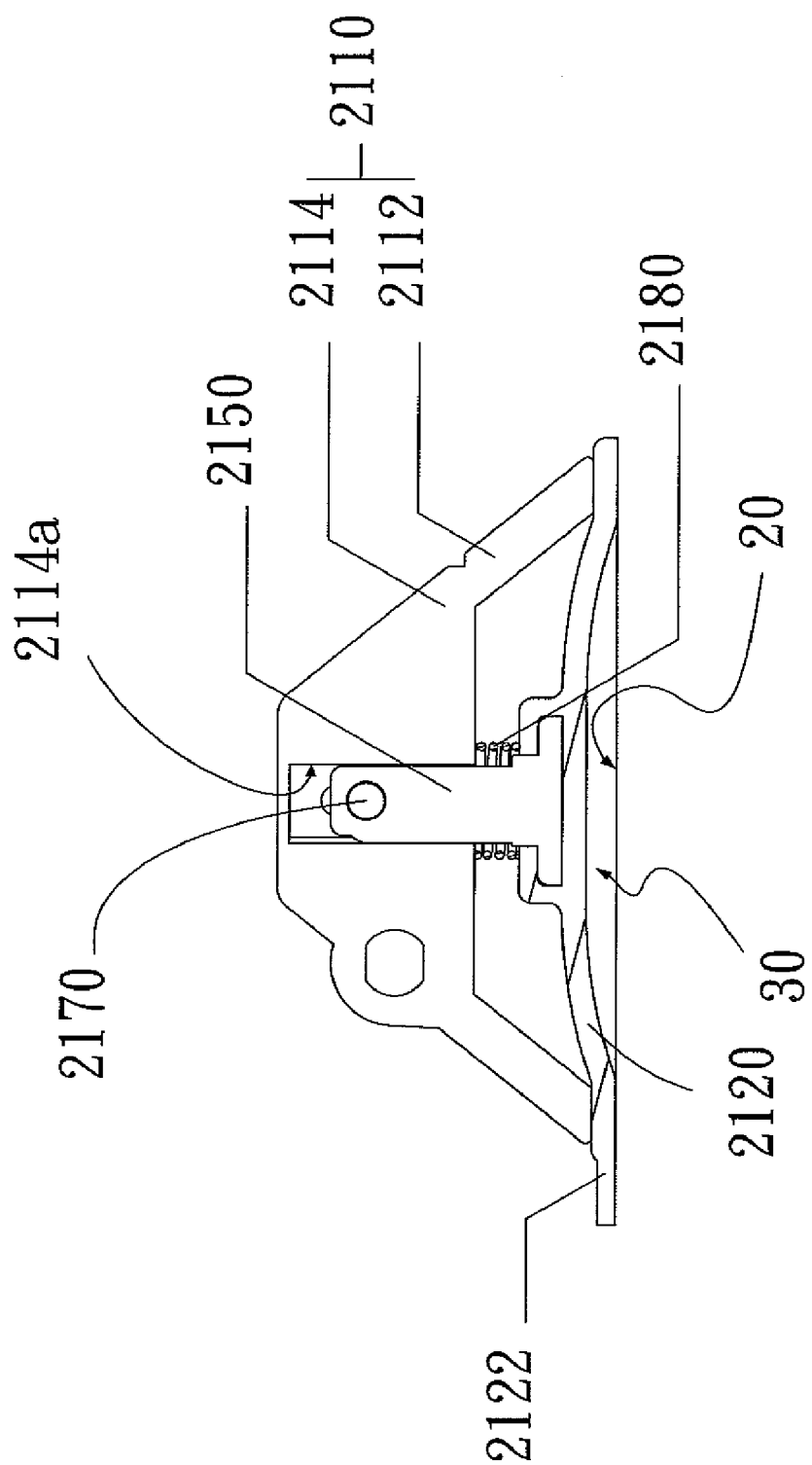
FIG. 4B is a sectional view of an embodiment of the anchor of the invention with the pushing member in a depressed condition.

Refer to FIGS. 3 and 4B for a condition in which the pushing member is depressed. When the pushing member 2160 is depressed the upright post 2150 is moved upwards and the lower shell 2112 compresses the suction cup 2120. As the outer rim of the suction cup 2120 receives the downward compression force of the lower shell 2112, external air does not enter through a gap 30 formed between the suction cup 2120 and an adsorption surface 20. Therefore the suction cup 2120 can adsorb to the adsorption surface 20 for a longer time. Moreover, the upright post 2150 also is coupled with a spring 2180. When the pushing member 2160 is released, the anchor body 2110 bounces back to its original position. There is also a drawing element 2122 located at the outer rim of the suction cup 2120. When the pushing member 2160 is released the anchor dock 2100 can be removed from the adsorption surface 20 by means of the drawing element 2122.

In this embodiment the suction cup 2120 serves as an adsorption portion of the anchor dock 2100. Of course to those skilled in the art other means (such as adhesive tapes or static charge adsorption) may also be used to anchor the anchor dock 2100 on the adsorption surface.

Figure 5:
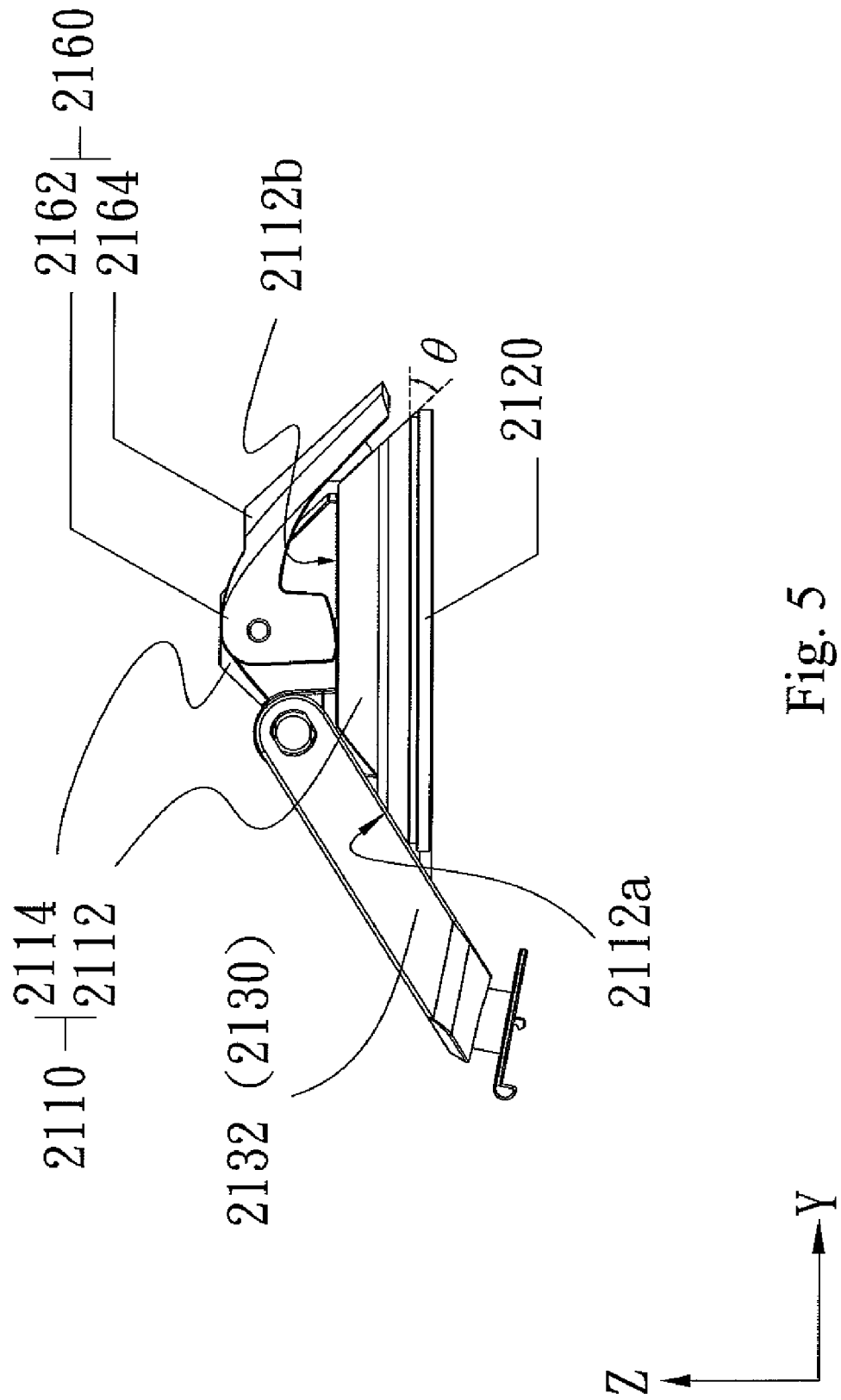
FIG. 5 is a side view of an embodiment of the anchor dock of the invention.

In addition, referring to FIG. 2, the bracing rack 2130 surrounds the pushing member 2160 and the upper shell 2114. Namely, in terms of X axis, two parallel bars 2132 of the bracing rack 2130 are spaced from each other at a distance greater than the interval of the two latch plates 2162 of the pushing member 2160. Hence when the bracing rack 2130 swivels it does not interfere with the upper shell 2114 and the pushing member 2160. Thus the bracing rack 2130 can be swiveled at a greater angle. Referring to FIG. 5, the latch plates 2162 are against the upper surface 2112b of the lower shell 2112. The bars 2132 of the bracing rack 2130 are leaned on the side surface 2112a of the lower shell 2112. The side surface 2112a is a conical surface formed at a sloped angle θ. In this embodiment the sloped angle θ is 45°. Therefore, the bracing rack 2130 can be swiveled between 0° and 225°. Of course, to those skilled in the art the swivelable angle of the bracing rack 2130 can be altered by adjustment. The sloped angle θ is preferably between 30° and 60°.

In this embodiment the suction cup 2120 is formed at a diameter of 60 mm. The height of the anchor body 2110 is 25 mm. Test results show that the maximum loading capacity of the anchor dock 2100 in the vertical direction (Z axis) is 5.5 kg, and the maximum loading capacity in the horizontal direction (XY axes) is 7.5 kg. As most handsets or PDAs now on the market are less than 1 kg in weight, the anchor dock 2100 of this embodiment can easily support most handsets or PDAs. The test results also indicate that the anchor dock 2100 of the invention can support a greater load than the conventional anchor docks with a suction cup of the same size now on the market.

As a conclusion, the bracing rack 2130 of anchor dock 2100 of the invention can be swiveled without interfering the upper shell 2114 and the pushing member 2160. The side surface 2112a of the lower shell is a conical surface formed at a sloped angle θ. Hence the swivelable angle of the bracing rack 2130 can be greater than 180°. Compared with the conventional bracing rack 1140 (referring to FIG. 1), the bracing rack 2130 of the invention does not have elastic fatigue problem. Hence it has a longer life span. Moreover, the anchor dock 2100 of this embodiment can be formed with a compact profile to facilitate carrying. And, compared to the conventional anchor dock 1100, it's easier for the user to carry the anchor dock 2100.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

We claim:

1. An anchor dock, comprising:
   an anchor body having a lower shell and a upper shell, the lower shell having a conical side surface formed at a sloped angle, the upper shell being located on the upper surface of the lower shell;
   an adsorption portion located below the anchor body; and
   a bracing rack which is formed in a U-shape and surrounds the upper shell and has two ends hinged on the anchor body;
   wherein the adsorption portion is a suction cup, the upper shell having a sliding trough which has two sides each having a longitudinal slot, the anchor dock further having:
   an upright post which is slidably located in the sliding trough and has a bottom end connecting to an upper side of the suction cup and a top end which has a first through hole formed thereon;
   a pushing member which has one end coupling with two latch plates, each of the latch plates having a second through hole; and
   a first axle running through the slot, the first through hole and the second through hole;
   wherein the bracing rack surrounds the upper shell and the pushing member.

2. The anchor dock of claim 1 further having a spring coupled on the upright post.

3. The anchor dock of claim 1, wherein the suction cup further has a drawing element located at an outer rim thereof.

4. The anchor dock of claim 1, wherein the sloped angle of the side surface of the lower shell is between 30° and 60°.

5. The anchor dock of claim 1 further having a latch tray located on the bracing rack.

* * * * *